(12) United States Patent
Guan

(10) Patent No.: US 11,706,850 B2
(45) Date of Patent: Jul. 18, 2023

(54) METHOD, DEVICE, AND SYSTEM FOR REGULATING TEMPERATURE OF MAGNETRON, VARIABLE-FREQUENCY POWER SUPPLY, AND MICROWAVE APPARATUS

(71) Applicant: SHENZHEN MEGMEET ELECTRICAL CO., LTD, Shenzhen (CN)

(72) Inventor: Jihong Guan, Shenzhen (CN)

(73) Assignee: SHENZHEN MEGMEET ELECTRICAL CO., LTD, Shenzhen (CN)

(*) Notice: Subject to any disclaimer, the term of this patent is extended or adjusted under 35 U.S.C. 154(b) by 789 days.

(21) Appl. No.: 16/790,870

(22) Filed: Feb. 14, 2020

(65) Prior Publication Data

US 2020/0214093 A1 Jul. 2, 2020

Related U.S. Application Data

(63) Continuation of application No. PCT/CN2018/083389, filed on Apr. 17, 2018.

(30) Foreign Application Priority Data

Aug. 16, 2017 (CN) .......................... 201710702609.7

(51) Int. Cl.
  *H05B 6/68* (2006.01)
  *H05B 6/66* (2006.01)
  *H02M 3/28* (2006.01)

(52) U.S. Cl.
  CPC .............. *H05B 6/682* (2013.01); *H02M 3/28* (2013.01); *H05B 6/664* (2013.01)

(58) Field of Classification Search
  CPC ... H02M 3/28; H05B 2206/043; H05B 6/664; H05B 6/682; H05B 6/683; Y02B 40/00
  (Continued)

(56) References Cited

U.S. PATENT DOCUMENTS 5,571,439 A * 11/1996 Daley .................... H05B 6/683
  315/106
2003/0218009 A1 11/2003 Lee

FOREIGN PATENT DOCUMENTS

CN     104090624 A     10/2014
CN     104968061 A     10/2015
  (Continued)

OTHER PUBLICATIONS

Translation of WO 2017/012338, Microwave oven and stating control device and method for variable frequency power supply of microwave oven, Jan. 28, 2017, by ProQuest. (Year: 2017).*

*Primary Examiner* — Quang T Van
(74) *Attorney, Agent, or Firm* — IPro, PLLC

(57) ABSTRACT

A method for regulating a temperature of a magnetron includes: determining an anode current flowing through the magnetron and an output power of a variable-frequency power supply, the output power being configured to drive the magnetron to operate; calculating an anode voltage of the magnetron according to the anode current of the magnetron and the output power of the variable-frequency power supply; calculating an anode temperature of the magnetron according to the anode voltage of the magnetron; and regulating the output power of the variable-frequency power supply according to the anode temperature of the magnetron.

17 Claims, 10 Drawing Sheets

(58) Field of Classification Search
USPC ....... 219/702, 710, 711, 712, 715, 716, 717,
219/718, 745, 746, 761; 331/71, 86, 91,
331/101, 105, 106, 107, 307, 785;
363/21, 28, 96
See application file for complete search history.

(56) References Cited

FOREIGN PATENT DOCUMENTS

| | | |
|---|---|---|
| CN | 105142254 A | 12/2015 |
| CN | 107592694 A | 1/2018 |
| WO | WO-2017012338 A1 * | 1/2017 |

* cited by examiner

METHOD, DEVICE, AND SYSTEM FOR REGULATING TEMPERATURE OF MAGNETRON, VARIABLE-FREQUENCY POWER SUPPLY, AND MICROWAVE APPARATUS

CROSS-REFERENCE TO RELATED APPLICATION

This disclosure is a continuation of International Patent Application No. PCT/CN2018/083389, filed on Apr. 17, 2018, which is based upon and claims priority of Chinese Patent Application No. 201710702609.7, filed on Aug. 16, 2017, titled "METHOD, DEVICE, AND SYSTEM FOR REGULATING TEMPERATURE OF MAGNETRON, VARIABLE-FREQUENCY POWER SUPPLY, AND MICROWAVE APPARATUS", the entire contents of which are incorporated herein by reference.

TECHNICAL FIELD

The present application relates to the technical field of microwave apparatuses, and in particular, relates to a method and device for regulating a temperature of a magnetron, a controller, a variable-frequency power supply, a system for regulating a temperature of a magnetron, and a microwave apparatus.

BACKGROUND microwave apparatuses are extensively applied in various fields, including industrial applications, military applications, civil applications and the like.

A traditional microwave apparatus may drive a magnetron to generate microwaves, such that the microwaves affect a load of the microwave apparatus.

During practice of the present application, the applicant has identified that the related art has at least the following problem: In the process that the microwave apparatus affects the load, due to uncertainty of the load, the temperature of the magnetron may abruptly rise; and in this case, if no appropriate measures are taken, the magnetron is apt to be subjected to over-temperature and thus damaged. As a result, the life time of the magnetron is greatly shortened.

SUMMARY

In a first aspect, embodiments of the present application provide a method for regulating a temperature of a magnetron. The method includes: determining an anode current flowing through the magnetron and an output power of a variable-frequency power supply, the output power being configured to drive the magnetron to operate; calculating an anode voltage of the magnetron according to the anode current of the magnetron and the output power of the variable-frequency power supply; regulating the output power of the variable-frequency power supply according to the anode voltage of the magnetron.

In a second aspect, embodiments of the present application provide a device for regulating a temperature of a magnetron. The device includes: a determining module, configured to determine an anode current flowing through the magnetron and an output power of a variable-frequency power supply, the output power being configured to drive the magnetron to operate; a calculating module, configured to calculate an anode voltage of the magnetron according to the anode current of the magnetron and the output power of the variable-frequency power supply; a regulating module, configured to regulate the output power of the variable-frequency power supply according to the anode voltage of the magnetron.

In a third aspect, embodiments of the present application provide a controller. The controller includes: at least one processor; and a memory communicably connected to the at least one processor; wherein the memory stores instructions executable by the at least one processor, wherein the instructions, when being executed by the at least one processor, cause the at least one processor to perform the method for regulating the temperature of the magnetron as described above.

In a fourth aspect, embodiments of the present application provide a variable-frequency power supply for driving a magnetron. The variable-frequency power supply includes: a variable-frequency circuit, configured to drive the magnetron; a first current sampling circuit, connected to a first node between the variable-frequency circuit and the magnetron, and configured to sample an anode current flowing through the magnetron; the controller as described above, connected to the first current sampling circuit and the variable-frequency circuit respectively.

In a fifth aspect, embodiments of the present application provide a system for regulating a temperature of a magnetron. The system includes: the magnetron; a variable-frequency power supply, connected to the magnetron, and configured to drive the magnetron; a second current sampling circuit, connected to a first node between the variable-frequency power supply and the magnetron, and configured to sample an anode current flowing through the magnetron; the controller as described above, connected to the second current sampling circuit and the variable-frequency circuit respectively.

In a sixth aspect, embodiments of the present application provide a microwave apparatus. The microwave apparatus includes the controller as described above.

In a seventh aspect, embodiments of the present application provide a non-transitory computer-readable storage medium. The non-transitory computer-readable storage medium stores computer-executable instructions, which, when being executed, cause the microwave apparatus to perform the method for regulating the temperature of the magnetron as described above.

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

microwave apparatuses according to the embodiments of the present application include industrial microwave apparatuses, medical microwave apparatuses, civil microwave apparatuses, military microwave apparatuses and the like. In the industrial applications, the industrial microwave apparatuses may be used to quickly heat, dry and modify materials. In the medical applications, the medical microwave apparatuses may be used to sterilize drugs or medicaments, and ablate lesions. In the civil applications, the civil microwave apparatuses may be used to microwave food or the like. In the military applications, the microwave apparatuses may be used for target detection, navigation or the like.

The microwave apparatus according to the embodiments of the present application may be a variable-frequency microwave apparatus, or may be another type of microwave apparatus.

Figure 1:
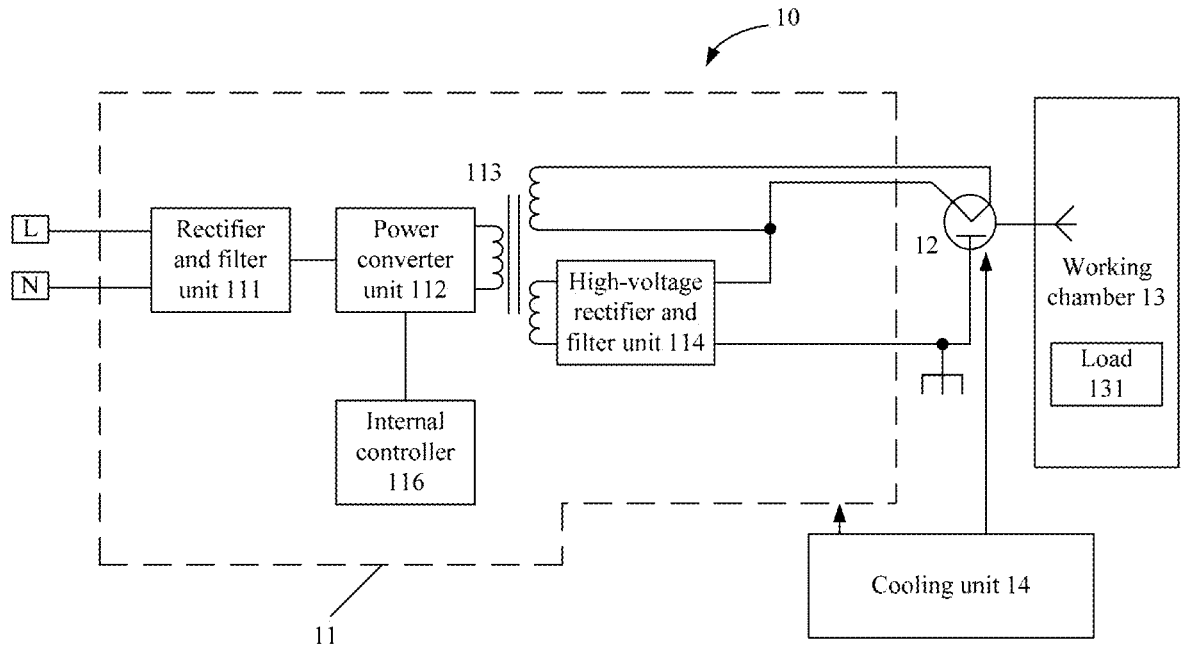
FIG. 1 is a schematic structural diagram of a microwave apparatus according to an embodiment of the present application.

Referring to FIG. 1, FIG. 1 is a schematic structural diagram of a microwave apparatus 10 according to an embodiment of the present application. As illustrated in FIG. 1, the microwave apparatus 10 includes: a variable-frequency power supply 11, a magnetron 12, an working chamber 13 and a cooling unit 14, wherein the variable-frequency power supply 11 is connected to the magnetron 12.

Still referring to FIG. 1, the variable-frequency power supply 11 includes a rectifier and filter unit 111, a power converter unit 112, a high-voltage transformer 113, a high-voltage rectifier and filter unit 114 and an internal controller 116. An input terminal of the rectifier and filter unit 111 is connected to an external power supply, an output terminal of the rectifier and filter unit 111 is connected to an input terminal of a power converter unit 112, an output terminal of the power converter unit 112 is connected to a primary winding of the high-voltage transformer 113, a secondary winding of the high-voltage transformer 113 is connected to an input terminal of the high-voltage rectifier and filter unit 114, an output terminal of the high-voltage rectifier and filter unit 114 is connected to the magnetron 12, and the internal controller 116 is connected to the power converter unit 112.

The variable-frequency power supply 11 may drive the magnetron 12 to operate, and supply a desired voltage and current to the magnetron 12. The rectifier and filter unit 111 is connected to the external power supply, and rectifies and filters the external power supply and outputs a direct-current voltage. The external power supply may be a mains voltage, or may be an industrial voltage.

The internal controller 116 acquires an input voltage, a current and the like information, calculates an input power for actual operation, converts the input power to a desired pulse width modulation (PWM) signal or a pulse frequency modulation (PFM) signal or a hybrid wave of the two for driving the power converter unit 112 to operate according to a rated power.

An output of the high-voltage transformer 113 is processed by the high-voltage rectifier and filter unit 114, and the high-voltage rectifier and filter unit 114 outputs a smooth direct-current high voltage and supplies the voltage to an anode of the magnetron 12. In addition, the high-voltage rectifier and filter unit 114 also supplies a filament voltage to a filament of the magnetron 12.

The magnetron 12 may convert electrical energy supplied by the variable-frequency power supply 11 to a corresponding microwave to heat a load 131 placed in the working chamber 13. For example, when the microwave apparatus is a microwave oven, the working chamber 13 accommodates food to be microwave-heated.

The cooling unit 14 may bring away the heat generated when the variable-frequency power supply 11 and the magnetron 12 operate, such that the variable-frequency power supply 11 and the magnetron 12 may reliably and stably operate.

In some embodiments, the rectifier and filter unit 111, the power converter unit 112, the high-voltage transformer 113 and the high-voltage rectifier and filter unit 114 may be summarized as a variable-frequency circuit. That is, the functions possessed by the rectifier and filter unit 111, the power converter unit 112, the high-voltage transformer 113 and the high-voltage rectifier unit 114 may be implemented in the form of the variable-frequency circuit. A person skilled in the art should understand that as a variable-frequency driver power supply for driving the magnetron 12, in addition to the above described electronic units (for example, the rectifier and filter unit 111, the power converter unit 112, the high-voltage transformer 113 and the high-voltage rectifier unit 114), other electronic units may be added to the variable-frequency circuit according to the service needs to further implement the other application needs.

Based on the above described microwave apparatus 10, when the microwave apparatus 10 heats the load 131, due to uncertainty of the load 131, the magnetron 12 is apt to operate in an over-temperature state. For example, during popcorn making by using a microwave oven, at an initial stage, moisture in the corn is sufficient and microwaves output by the magnetron are mostly absorbed by the corn, and in this case, temperature rise of the magnetron is relatively slow. However, when the popcorn popping is coming to an end, the corn contains less moisture, and most of the microwaves may not be absorbed by the corn and may be reflected back to the magnetron, which may cause an abrupt rise of the temperature of the magnetron. According to statistical data from the market, damage of the magnetron accounts for 50% of the failures of household microwave ovens, and the damage of the magnetron is mainly attributed to over-temperature.

Still for example, industrial microwave ovens are commonly used for drying materials, and at an initial stage, moisture in the materials is sufficient, and the temperature rise of the magnetron is controllable. When the drying of the materials is coming to an end, the materials contain less moisture, and a large quantity of microwaves is reflected back to the magnetron. As a result, the magnetron is subjected to severe heating, and thus the magnetron is apt to be damaged due to over-temperature. According to statistical data from the market, it is more common that the magnetrons of ordinary 2450 M industrial microwave apparatuses are damaged, and a damage rate reaches up to 15%, mainly due to over-temperature.

In addition, when the cooling unit 14 in the microwave apparatus 10 fails, since the heat of the magnetron 12 is not timely brought away, the temperature of the magnetron 12 abruptly rises. Consequently, the magnetron 12 is damaged.

Figure 2:
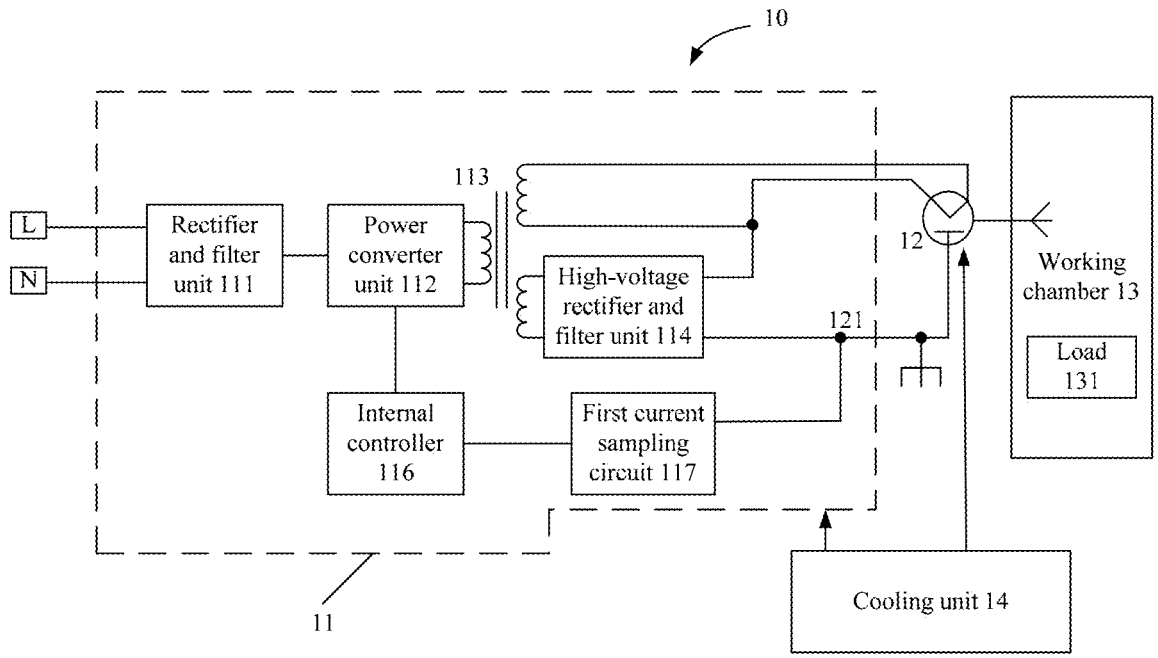
FIG. 2 is a schematic structural diagram of another microwave apparatus according to an embodiment of the present application.

Based on various defects of the above microwave apparatus, an embodiment of the present application provides another microwave apparatus 10. Different from the microwave apparatus as illustrated in FIG. 1, as illustrated in FIG. 2, the variable-frequency power supply in the microwaves device 10 further includes a first current sampling circuit 117, wherein the first current sampling circuit 117 is connected to a first node 121 between the variable-frequency circuit and the magnetron 12, and configured to sample an anode current flowing through the magnetron 12, and feed back the anode current to the internal controller 116. Then, the internal controller 116 may regulate an anode temperature of the magnetron according to the anode current flowing through the magnetron 12.

The microwave apparatus regulates the anode temperature of the magnetron by the following working principles:

First, the variable-frequency power supply 11 operates according to a predetermined power. The predetermined power may be an initial power defaulted in the variable-frequency power supply 11. During the operation, the internal controller 116 receives the anode current flowing through the magnetron that is fed back by the first current sampling circuit 117.

Then, the internal controller 116 may calculate the anode temperature of the magnetron according to the anode current flowing through the magnetron 12.

Figure 3:
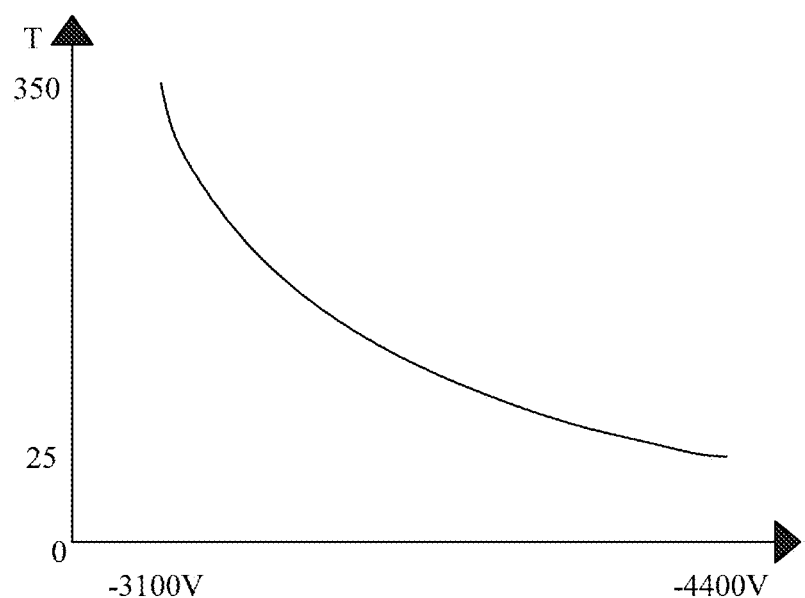
FIG. 3 is a schematic diagram of a relationship between an anode temperature and an anode voltage of 1 KW and 2450 M magnetron according to an embodiment of the present application.

Specifically, referring to FIG. 3, FIG. 3 is a schematic diagram of a relationship between an anode temperature and an anode voltage of 1 KW and 2450 M magnetron according to an embodiment of the present application. As illustrated in FIG. 3, the abscissa denotes the anode voltage of the magnetron 12, and the ordinate denotes the anode temperature of the magnetron 12. When the magnetron 12 operates, the anode temperature of the magnetron 12 progressively rises, and the corresponding anode voltage increases accordingly. Apparently, when the anode temperature of the magnetron 12 reaches 350° C., the anode voltage of the magnetron 12 has risen to −3100 V. In this case, the life time of the magnetron 12 is drastically shortened, and the magnet mounted on the anode of the magnetron is subject to a risk of magnetic flux.

In general, as illustrated in FIG. 3, the anode temperature to of the magnetron 12 is positively correlated to the anode voltage emb, and such a relationship therebetween may be expressed by the following formula (1):

$$ta = f(emb) \tag{1}$$

Figure 4:
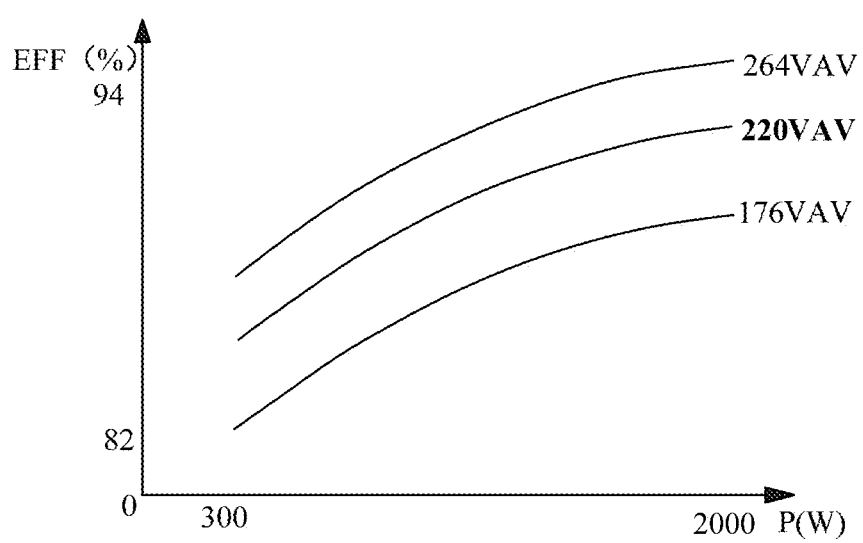
FIG. 4 is a schematic diagram of a relationship between a power efficiency, an input power and an input voltage of a variable-frequency power supply according to an embodiment of the present application.

Referring to FIG. 4, FIG. 4 is a schematic diagram of a relationship between a power efficiency, an input power and an input voltage of a variable-frequency power supply according to an embodiment of the present application. As illustrated in FIG. 4, the abscissa denotes the input power of the variable-frequency power supply, and the ordinate denotes the power efficiency of the variable-frequency power supply. With respect to the same input voltage, the power efficiency of the variable-frequency power supply is positively correlated to the input power. With respect to the same input power, the power efficiency of the variable-frequency power supply is positively correlated to the input voltage.

In general, as illustrated in FIG. 4, the relationship between the power efficiency EFF, the input power Pin and the input voltage Vin of the variable-frequency power supply may be expressed by the following formula (2):

$$EFF = f(Vin, Pin) \tag{2}$$

The variable-frequency power supply operates in a predetermined power operating mode, and the input power Pin for actual operating is known. If the power efficiency EFF is known, the output power Po may be calculated by using the following formula (3):

$$Po = Pin * Eff \tag{3}$$

After the output power Po is calculated, the anode voltage ebm may be calculated according to the acquired anode current Ib flowing through the magnetron in combination with the following formula (4):

$$ebm = Po/Ib \tag{4}$$

Therefore, when the internal controller 116 acquires the input power Pin and the input voltage Vin of the variable-frequency power supply 11, the internal controller 116 determines the power efficiency EFF according to the corresponding relationship between the input power Pin, the input voltage Vin and the power efficiency EFF of the variable-frequency power supply (in combination with the formula (2) as illustrated in FIG. 4). Then, the internal controller 116 calculates the output power Po of the variable-frequency power supply 11 according to the formula (3). Afterwards, the internal controller 116 calculates the anode voltage of the magnetron 12 according to the output power of the variable-frequency power supply 11 and the anode current flowing through the magnetron 12 in combination with the formula (4). Generally, in practice, the anode voltage of the magnetron is generally greater than 1000 V, and thus the cost in directing acquiring the anode voltage of the magnetron 12 by an external voltage detection device is high, and the acquisition is complex. Therefore, according to this embodiment, after the anode current flowing through the magnetron and the output power of the variable-frequency power supply are acquired, the anode voltage is obtained by conversion. This fashion is simple and cost-efficient.

Finally, the internal controller 116 calculates the anode temperature of the magnetron 12 according to the anode voltage of the magnetron 12 in combination with the formula (1).

The internal controller 116 regulates the output power Po of the variable-frequency power supply 11 according to the anode temperature of the magnetron, wherein the output power Po is configured to drive the magnetron 12 to operate, to change the anode temperature of the magnetron 12.

Specifically, the internal controller 116 judges whether the anode temperature of the magnetron 12 is greater than a predetermined temperature threshold, and reduces the output power Po of the variable-frequency power supply 11 to lower the anode temperature of the magnetron if the anode temperature of the magnetron 12 is greater than the predetermined temperature threshold. If the anode temperature of the magnetron 12 is less than the predetermined temperature threshold, the internal controller 116 maintains operation of the variable-frequency power supply 11. That is, the original output power Po of the variable-frequency power supply 11 may be maintained, and the output power Po of the variable-frequency power supply 11 may be increased on the premise that the anode temperature of the magnetron 12 is less than the predetermined temperature threshold. The predetermined temperature threshold herein may be defined by a user according to the service needs.

In some embodiments, when the anode temperature of the magnetron 12 is greater than the predetermined temperature threshold, in the process that the internal controller 116 reduces the output power Po of the variable-frequency power supply 11, the internal controller 116 judges whether the output power Po of the variable-frequency power supply 11 is greater than a predetermined minimum power, and maintains operation of the variable-frequency power supply 11 and continuously detects the anode temperature of the magnetron 12 if the output power Po of the variable-frequency power supply 11 is greater than the predetermined minimum power. If the output power Po of the variable-frequency power supply 11 is less than the predetermined minimum power, it indicates that the variable-frequency power supply 11 loses the capability of controlling the anode temperature of the magnetron 12. In this case, even if the variable-frequency power supply 11 is made to operate according to the predetermined minimum power, the anode temperature of the magnetron 12 is still subject to over-temperature. Accordingly, the internal controller 116 should stop operation of the variable-frequency power supply 11, to prevent the magnetron 12 from operating in an over-temperature state. In addition, when the cooling unit 14 in the microwave apparatus 10 fails, for example, a cooling pump, or a fan or the like fails, it is possible in this case that the variable-frequency power supply 11 operates according to the predetermined minimum power, and the magnetron 12 may also subject to be over-temperature. Therefore, in this case, it is necessary to shut down the variable-frequency power supply.

In general, the above embodiments illustrate a regulation fashion of "calculating the anode temperature of the magnetron according to the anode voltage of the magnetron, and further regulating the output power of the variable-frequency power supply according to the anode temperature of the magnetron". In some embodiments, the internal controller 116 may also determine the output power of the variable-frequency power supply 11 according to the anode voltage of the magnetron 12 by directly checking the table, and hence regulate the output power of the variable-frequency power supply 11. Therefore, first, the internal controller 116 acquires a predetermined association table. The predetermined association table is pre-established by the user according to experience and practice, wherein the predetermined association table pre-stores a mapping relationship between the anode voltage of the magnetron 12 and the output power of the variable-frequency power supply 11. Then, during regulation of the anode temperature of the magnetron 12, the internal controller traverses the predetermined association table according to the calculated anode voltage of the magnetron, and searches out the output power of the variable-frequency power supply 11 corresponding to the anode voltage of the magnetron 12 from the predetermined association table. Finally, the internal controller 116 regulates the current output power of the variable-frequency power supply 11 to the output power that is searched out, and in this case, regulation of the anode temperature of the magnetron 12 is completed.

In summary, since in the embodiment of the present application, the anode current flowing through the magnetron 12 is directly obtained, and the anode voltage of the magnetron 12 is indirectly obtained to determine the anode temperature, at least the following merits are achieved: In direct detection of the temperature of the magnetron based on detection of a temperature parameter by a temperature sensor arranged on the housing of the magnetron 12, since the housing of the magnetron 12 is made of iron, and thermal conductivity thereof is poor; therefore, under different cooling conditions, the temperature of the housing fails to actually reflect the real anode temperature of the magnetron 12. In addition, the cost of arranging the temperature sensor is high, and a corresponding circuit also needs to be arranged to process temperature information. Therefore, this solution is not advantageous in terms of cost. However, in the embodiment of the present application, the anode current flowing through the magnetron 12 may be directly obtained such that anode temperature of the magnetron 12 may be accurately reflected, so as to accurately and reliably adjust the anode temperature by regulating the output power of the variable-frequency power supply 11, and prevent over-temperature-induced damage of the magnetron 12.

Figure 5:
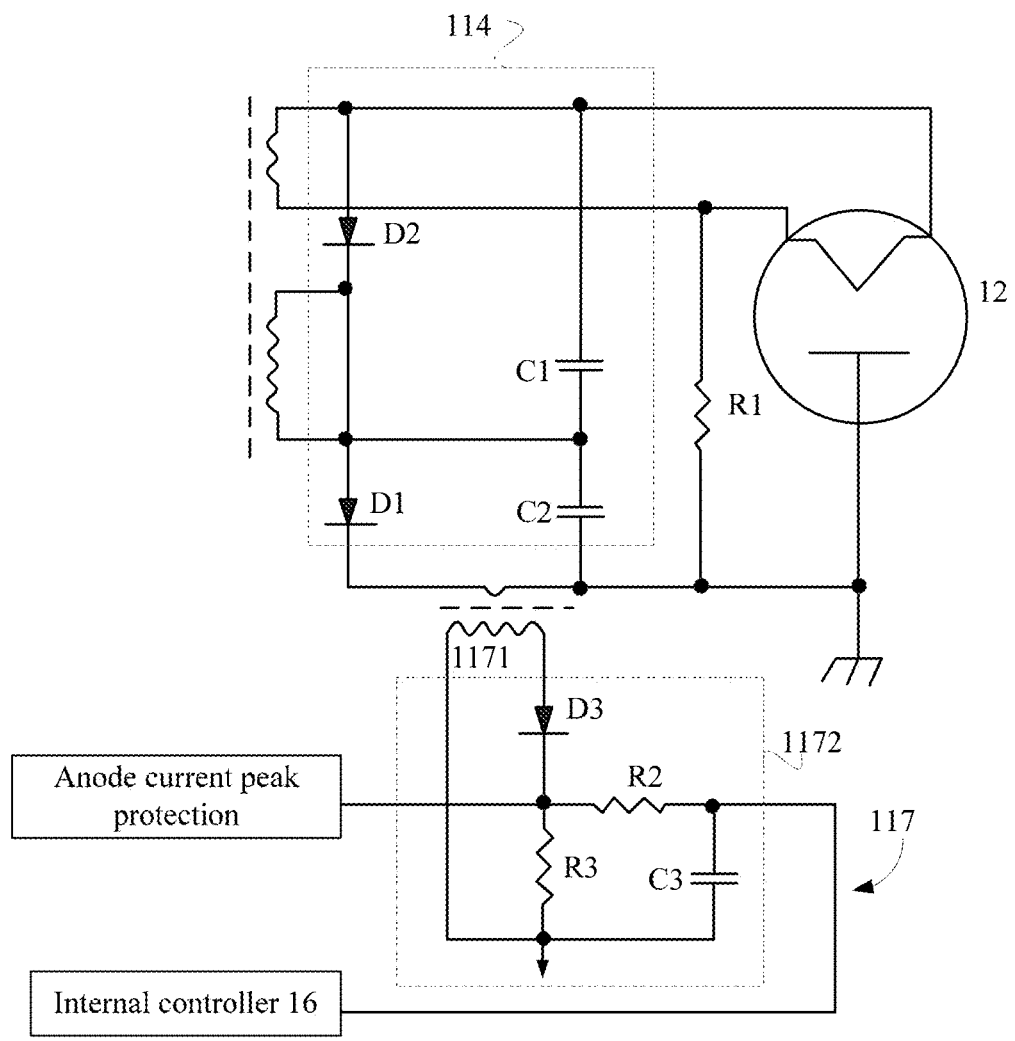
FIG. 5 is a schematic structural diagram of a first current sampling circuit according to an embodiment of the present application.

In some embodiments, as illustrated in FIG. 5, the first current sampling circuit 117 includes: a current transformer 1171 and a first signal conditioning circuit 1172. The current transformer 1171 is coupled between the variable-frequency circuit 11 and the magnetron 12, and configured to sample the anode current flowing through the magnetron. The first signal conditioning circuit 1172 is connected to the current transformer 1171, and configured to condition the anode current sampled by the current transformer 1171.

Still referring to FIG. 5, the high-voltage rectifier and filter unit 114 includes: a first diode D1, a second diode D2, a first capacitor C1 and a second capacitor C2. A first resistor R1 is a high-voltage discharge resistor, and discharges electrical energy stored on the first capacitor C1 and the second capacitor C2 when the variable-frequency power supply 11 stops operating. The current transformer 1171 is connected in series between the first diode D1 and the second capacitor C2.

The first signal conditioning circuit 1172 includes: a third diode D3, a second resistor R2, a third resistor R3 and a third capacitor C3. An output of the current transformer 1171 is rectified by the third diode D3, an output current flows through the third resistor R3 according to a turn-ratio relationship, and a ripple voltage which is proportional to the anode current is obtained on the third resistor R3. One way of the ripple voltage is supplied to an anode current peak protection circuit for detecting a short circuit, an overload or the like failure of the magnetron, and the other way of the ripple voltage flows through a filter circuit constituted by the second resistor R2 and the third capacitor C2 and is converted to a smooth direct-current voltage and supplied to the internal controller 116 for calculating the anode temperature of the magnetron 12.

Figure 6:
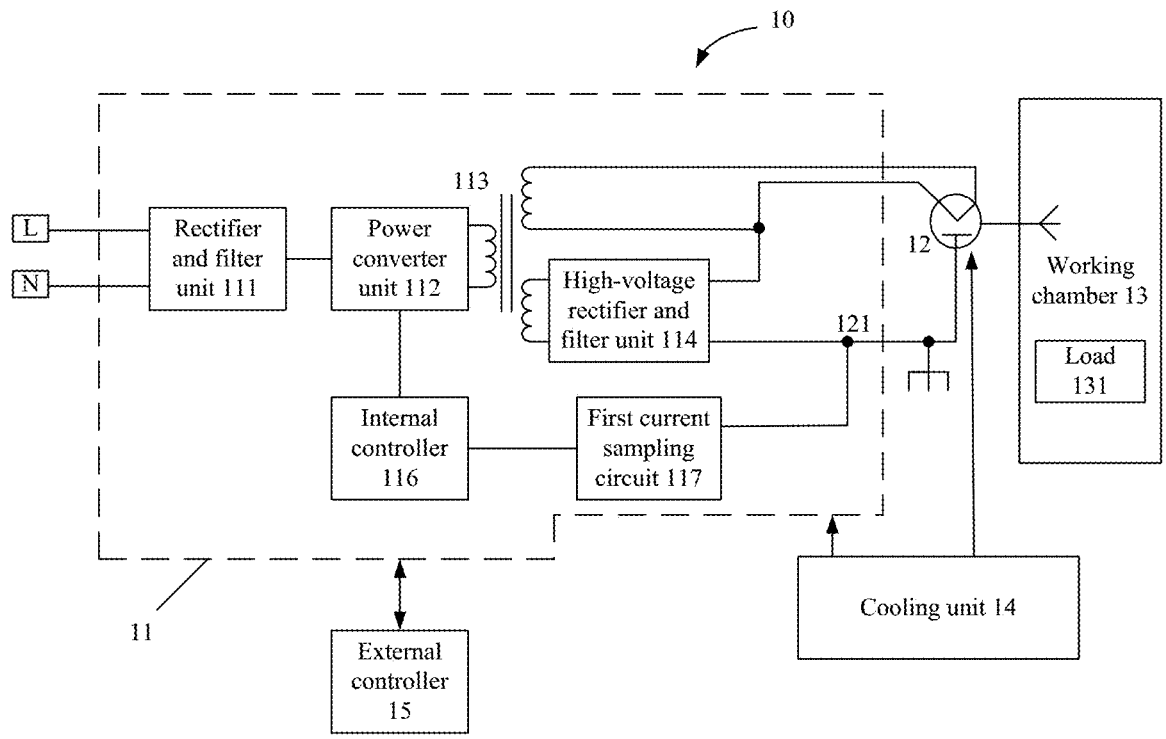
FIG. 6 is a schematic structural diagram of a microwave apparatus according to another embodiment of the present application.

Different from the above embodiments, as illustrated in FIG. 6, the microwave apparatus 10 further includes an external controller 15, wherein the external controller 15 is connected to the variable-frequency power supply 11. The external controller 15 sends target power information to the variable-frequency power supply 11, such that the power converter unit 112 in the variable-frequency power supply 11 converts the target power information to a pulse width modulation (PWM) signal or a pulse frequency modulation (PFM) signal or a hybrid wave of the two, and operates according to a rated power. In addition, the external controller 15 further receives various control information fed back by the variable-frequency power supply 11, to regulate the output power of the variable-frequency power supply. In this way, the system power is flexibly regulated, and operation of the variable-frequency power supply 11 is monitored.

In the above embodiments, the current transformer 1171 is an insulating device. Therefore, the problem of primary and secondary insulation may be solved. In this way, the current transformer may be conveniently applied to the variable-frequency power supply as described in the above embodiments.

In some embodiments, the current transformer 1171 may be replaced by a Hall device or a current detection resistor plus a linear opticoupler or the like device. A person skilled in the art should understand that others may select an acquisition way according to the service needs, and any replacements or variations made to the current acquisition way based on the teachings given in the embodiments of the present application shall all fall within the protection scope of the embodiments of the present application.

In the above embodiments, it may be understood that the control logics for the temperature regulation for the magnetron according to the above embodiments may be practiced in the form of a software module, wherein the software module may be stored not only in the internal controller 116 in the variable-frequency power supply 11 in the form of instructions, but also in the external controller 15.

Figure 7:
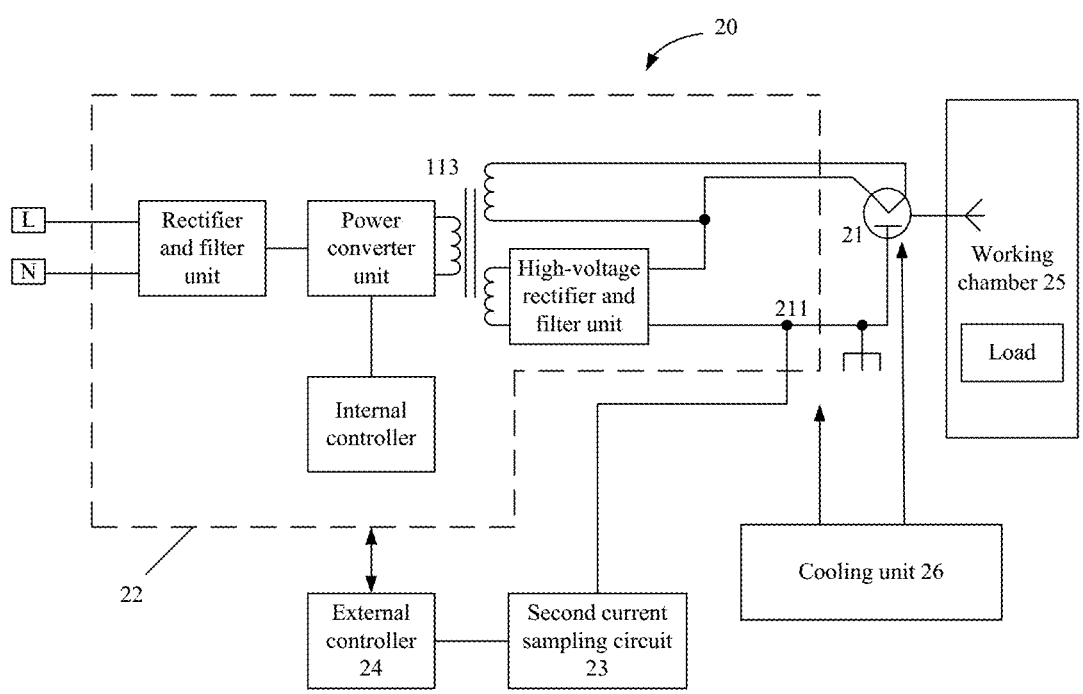
FIG. 7 is a schematic structural diagram of a microwave apparatus according to still another embodiment of the present application.

Accordingly, for differentiation from the above embodiments, as another aspect of the embodiments of the present application, an embodiment of the present application further provides a system 20 for regulating a temperature of a magnetron. As illustrated in FIG. 7, the system 20 includes: a magnetron 21, a variable-frequency power supply 22, a second current sampling circuit 23, an external controller 24, an working chamber 25 and a cooling unit 26. The variable-frequency power supply 22 is connected to the magnetron 22, and configured to drive the magnetron 21. The second current sampling circuit 23 is connected to a first node 211 between the variable-frequency power supply 22 and the magnetron 21, and configured to sample an anode current flowing through the magnetron 21. The external controller 24 is connected to the second current sampling circuit 23 and the variable-frequency power supply 22 respectively.

In this embodiment, in the case of no confliction of the content, the magnetron 21, the variable-frequency power supply 22, the second current sampling circuit 23 and the external controller 24 may be referenced to the description of the above embodiments, which are not described herein any further.

As described above, as illustrated in FIG. 7, the external controller 24 herein stores several instructions for running the control logics for the temperature regulation for the magnetron, and the internal controller of the variable-frequency power supply 22 serves as a core for controlling normal operation of the variable-frequency power supply 22.

Similarly, the external controller 24 determines the anode current flowing through the magnetron, calculates an anode temperature of the magnetron, and regulates an output power of the variable-frequency power supply according to the anode temperature of the magnetron, wherein the output power is configured to drive the magnetron to operate. Therefore, the anode current flowing through the magnetron may be directly obtained such that anode temperature of the magnetron may be accurately reflected, so as to accurately and reliably adjust the anode temperature by regulating the output power of the variable-frequency power supply, and prevent over-temperature-induced damage of the magnetron.

Figure 8:
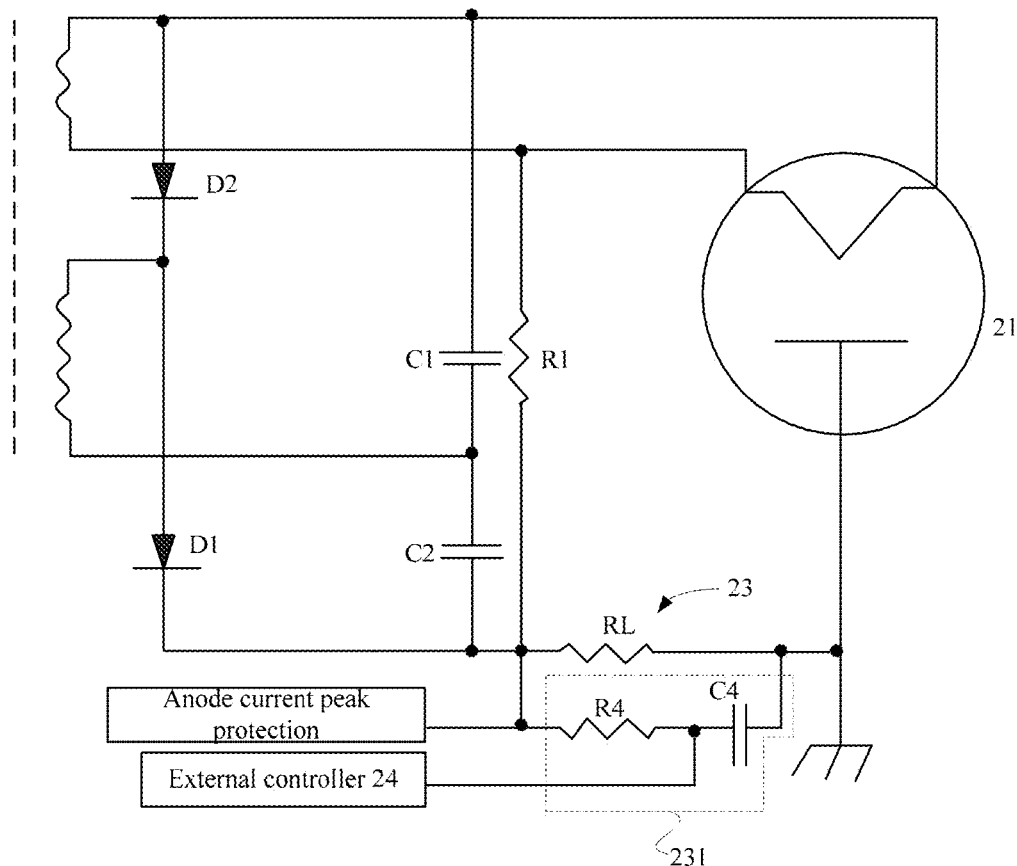
FIG. 8 is a schematic structural diagram of a second current sampling circuit according to an embodiment of the present application.

Different from the embodiment as illustrated in FIG. 5 or FIG. 6, as illustrated in FIG. 8, the second current sampling circuit 23 includes: a sampling resistor RL and a second signal conditioning circuit 231. The first sampling resistor RL is connected in series between the variable-frequency power supply 22 and the magnetron 21. The second signal conditioning circuit 231 is connected in parallel between two terminals of the sampling resistor RL, and configured to condition an anode current sampled by the sampling resistor RL.

Still referring to FIG. 8, the second signal conditioning circuit 231 includes: a fourth resistor R4 and a fourth capacitor C4. The sampling resistor RL converts the anode current flowing through the magnetron 21 to a voltage signal. One way of the sampled voltage signal is directly supplied to an anode current peak protection circuit for detecting a short circuit, an overload or the like failure of the magnetron, and the other way of the sampled voltage signal flows through the second signal conditioning circuit 231 constituted by the fourth resistor R4 and the fourth capacitor C4 and is converted to a smooth direct-current voltage and supplied to the external controller 24 for calculating the anode temperature of the magnetron 21.

The second current sampling circuit 23 may not have a primary and secondary insulation function, and may be better applicable to the system for regulating the temperature of the magnetron as illustrated in FIG. 2.

In this embodiment, the system 20 for regulating the temperature of the magnetron may be applied to any type of microwave apparatuses.

In the above embodiments, the internal controller or the external controller, as a controller, may be a general processor, a digital signal processor (DSP), an application specific integrated circuit (ASIC), a field programmable gate array (FPGA), a microcontroller unit, an Acore RISC machine (ARM), or another programmable logic device, a discrete gate or transistor logic device, or a discrete hardware component or a combination of these components. Further, the controller may also be any traditional processor, controller, microcontroller or state machine. The controller may also be practiced as a combination of computing devices, for example, a combination of a DSP and a microprocessor, a plurality of microprocessors, one or more microprocessors plus a DSP core, or any other such configuration.

Figure 9:
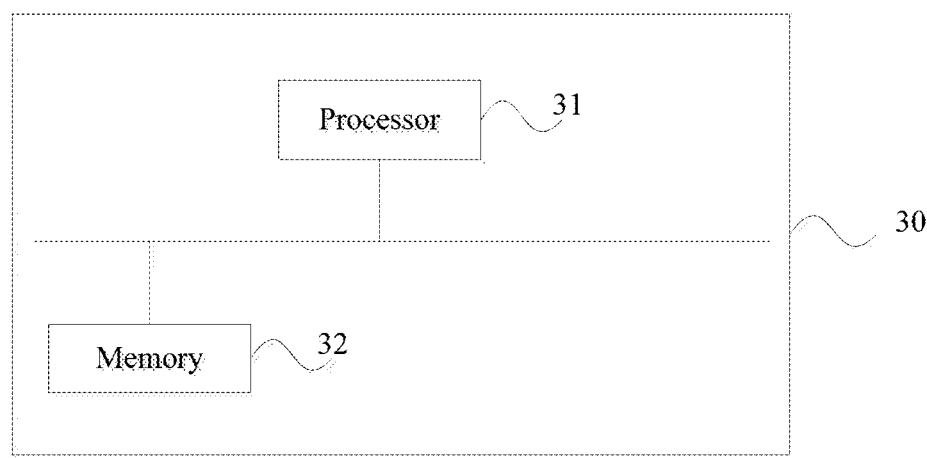
FIG. 9 is a schematic structural diagram of a controller according to an embodiment of the present application.

As illustrated in FIG. 9, the controller 30 (the internal controller or the external controller) includes: at least one processor 31 and a memory 32 communicably connected to the at least one processor 31; wherein FIG. 9 uses one processor 31 as an example. The at least one processor 31 and the memory 32 may be connected via a bus or in another manner, and FIG. 9 uses the bus as an example.

The memory 32 stores instructions executable by the at least one processor, wherein, the instructions, when being executed by the at least one processor, cause the at least one processor 31 to run control logic for performing the temperature regulation for the magnetron.

Therefore, the controller 30 may directly obtain the anode current flowing through the magnetron such that anode temperature of the magnetron may be accurately reflected, so as to accurately and reliably adjust the anode temperature by regulating the output power of the variable-frequency power supply, and prevent over-temperature-induced damage of the magnetron.

As another aspect of the embodiments of the present application, an embodiment of the present application provides a device 40 for regulating a temperature of a magnetron. The device for regulating the temperature of the magnetron, as a software system, may be stored in the internal controller 116 in the variable-frequency power supply 11 as illustrated in FIG. 2 and FIG. 6, or may be stored in the external controller as illustrated in FIG. 7. The device for regulating the temperature of the magnetron includes several instructions. The several instructions are stored in the memory, and the processor may access the memory to call the instructions and execute the instructions to perform control logic for performing the temperature regulation for the magnetron.

Figure 10:
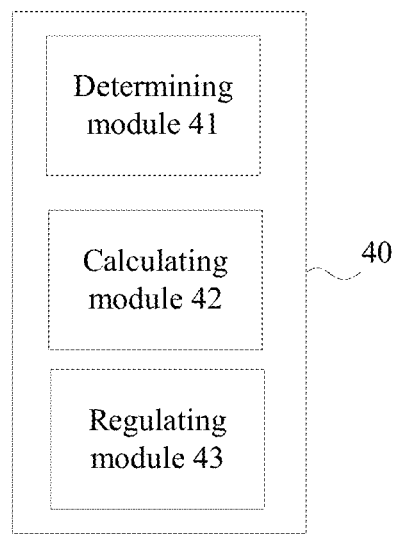
FIG. 10 is a schematic structural diagram of a device for regulating a temperature of a magnetron according to an embodiment of the present application.

As illustrated in FIG. 10, the device 40 for regulating the temperature of the magnetron includes: a determining module 41, a calculating module 42 and a regulating module 43.

The determining module 41 is configured to determine an anode current flowing through the magnetron and an output power of a variable-frequency power supply, the output power being configured to drive the magnetron to operate; the calculating module 42 is configured to calculate an anode voltage of the magnetron according to the anode current of the magnetron and the output power of the variable-frequency power supply; and the regulating module 43 is configured to regulate the output power of the variable-frequency power supply according to the anode voltage of the magnetron.

In this embodiment, the anode current flowing through the magnetron may be determined by directly acquiring the anode current flowing through the magnetron, or by acquiring another reference current and converting the same to the anode current flowing through the magnetron, for example, acquiring a current of a high-voltage diode or an output current of a high-voltage transformer for equivalent conversion to obtain the anode current flowing through the magnetron.

The device 40 for regulating the temperature of the magnetron may directly acquire the anode current flowing through the magnetron such that the anode temperature of the magnetron may be accurately reflected, so as to accurately and reliably adjust the anode temperature by regulating the output power of the variable-frequency power supply, and prevent over-temperature-induced damage of the magnetron.

Figure 11:
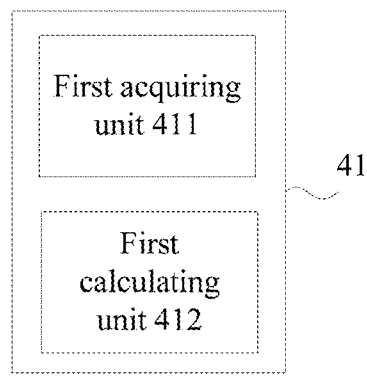
FIG. 11 is a schematic structural diagram of a determining module in FIG. 10.

In some embodiments, as illustrated in FIG. 11, the determining module 41 includes: a first acquiring unit 411 and a first calculating unit 412.

The first acquiring unit 411 is configured to acquire an input power and an input voltage of the variable-frequency power supply; and the first calculating unit 412 is configured to calculate the output power of the variable-frequency power supply according to a corresponding relationship between the input power and the input voltage of the variable-frequency power supply and a power efficiency thereof.

Figure 12:
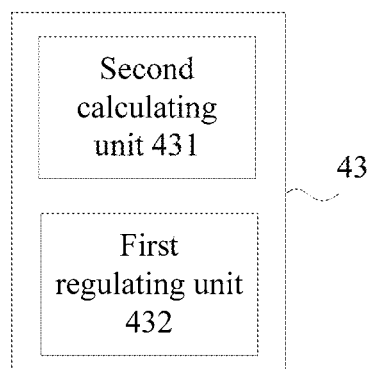
FIG. 12 is a schematic structural diagram of a regulating module in FIG. 10.

In some embodiments, as illustrated in FIG. 12, the regulating module 43 includes: a second calculating unit 431 and a first regulating unit 432.

The second calculating unit 431 is configured to calculate an anode temperature of the magnetron according to the anode voltage; and the first regulating unit 432 is configured to regulate the output power of the variable-frequency power supply according to the anode temperature of the magnetron.

Figure 13:
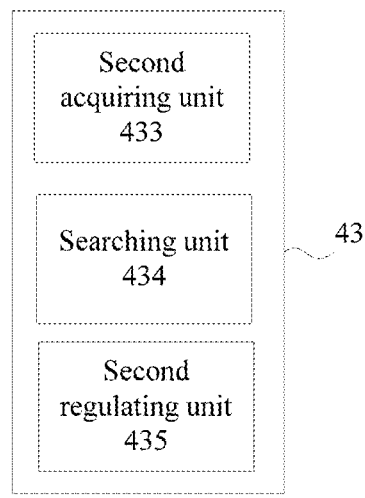
FIG. 13 is another schematic structural diagram of the regulating module in FIG. 10.

Different from the embodiment as illustrated in FIG. 12, as illustrated in FIG. 13, the regulating module 43 includes: a second acquiring unit 433, a searching unit 434 and a second regulating unit 435.

The second acquiring unit 433 is configured to acquire a predetermined association table, the association table prestoring a mapping relationship between the anode voltage of the magnetron and the output power of the variable-frequency power supply; the searching unit 434 is configured to search for the output power of the variable-frequency power supply corresponding to the anode voltage of the magnetron from the predetermined association table; and the second regulating unit 435 is configured to regulate the output power of the variable-frequency power supply to the output power that is searched out.

Figure 14:
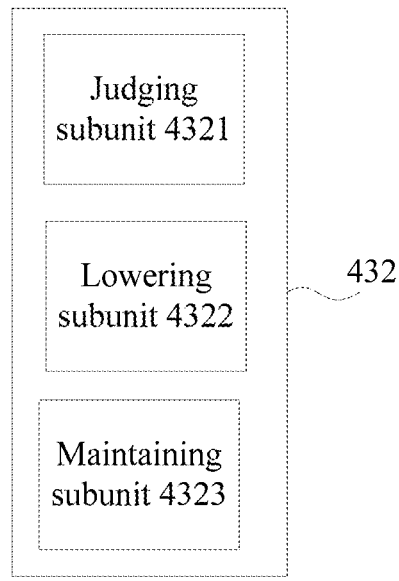
FIG. 14 is a schematic structural diagram of a first regulating unit in FIG. 12.

In some embodiments, as illustrated in FIG. 14, the first regulating unit 432 includes: a judging subunit 4321, a lowering subunit 4322 and a maintaining subunit 4323.

The judging subunit 4321 is configured to judge whether the anode temperature of the magnetron is greater than a predetermined temperature threshold; the lowering subunit 4322 is configured to lower the output power of the variable-frequency power supply if the anode temperature of the magnetron is greater than the predetermined temperature threshold; and the maintaining subunit 4323 is configured to maintain operation of the variable-frequency power supply if the anode temperature of the magnetron is less than the predetermined temperature threshold.

In some embodiments, the lowering subunit 4322 is specifically configured to: determine the output power of the variable-frequency power supply; judge whether the output power of the variable-frequency power supply is greater than a predetermined minimum power; maintain operation of the variable-frequency power supply if the output power of the variable-frequency power supply is greater than the predetermined minimum power; and stop operation of the variable-frequency power supply if the output power of the variable-frequency power supply is less than the predetermined minimum power.

Since the device embodiments are based on the same inventive concept as the above embodiments, in the case of no confliction of the content, the content of the device embodiments may be referenced to that of the above embodiments, which is not described herein any further.

As still another aspect of the embodiments of the present application, an embodiment of the present application provides a method 50 for regulating a temperature of a magnetron. The functions of the method for regulating the temperature of the magnetron according to the embodiment of the present application may also be implemented by virtue of a hardware platform in addition to being implemented by virtue of the software system of the device for regulating the temperature of the magnetron as illustrated in FIG. 10 to FIG. 14. For example, the method for regulating the temperature of the magnetron may be performed in a suitable type of electronic equipment having a processor having computing capabilities, for example, a microcontroller unit, a digital signal processor (DSP), a programmable logic controller (PLC), or the like.

The functions corresponding to the method for regulating the temperature of the magnetron according to the embodiments hereinafter are stored in a memory of an electronic equipment in the form of instructions. When the functions need to be implemented, a processor of the electronic equipment accesses the memory, and calls and executes the corresponding instructions to implement the functions corresponding to the method for regulating the temperature of the magnetron.

The memory, as a non-volatile computer-readable storage medium, may be configured to store non-volatile software programs, non-volatile computer-executable programs and modules, for example, the program instructions/the modules (for example the modules and the units as illustrated in FIG. 10 to FIG. 14) corresponding to the device 40 for regulating the temperature of the magnetron in the above embodiments, or the steps corresponding to the method for regulating the temperature of the magnetron according to the embodiments hereinafter. The processor performs various function applications and data processing of the device 40 for regulating the temperature of the magnetron by running the non-volatile software programs, the instructions and the modules stored in the memory, that is, performing the functions of the modules and the units in the device 40 for regulating the temperature of the magnetron or the functions of the steps corresponding to the method for regulating the temperature of the magnetron according to the embodiments hereinafter.

The memory may include a high speed random access memory, or include a non-volatile memory, for example, at least one disk storage device, a flash memory device, or another non-volatile solid storage device. In some embodiments, the memory optionally includes memories remotely configured relative to the processor. These memories may be connected to the processor over a network. Examples of the above network include, but not limited to, the Internet, Intranet, local area network, mobile communication network and a combination thereof.

The program instructions/the modules are stored in the memory, which, when being executed by at least one processor, cause the at least one processor to perform the method for regulating the temperature of the magnetron in any of the above method embodiments, for example, performing the steps in the methods according to the embodiments as illustrated in FIG. 15 to FIG. 20, and implementing the functions of the modules and the units according to the embodiments as illustrated in FIG. 10 to FIG. 14.

Figure 15:
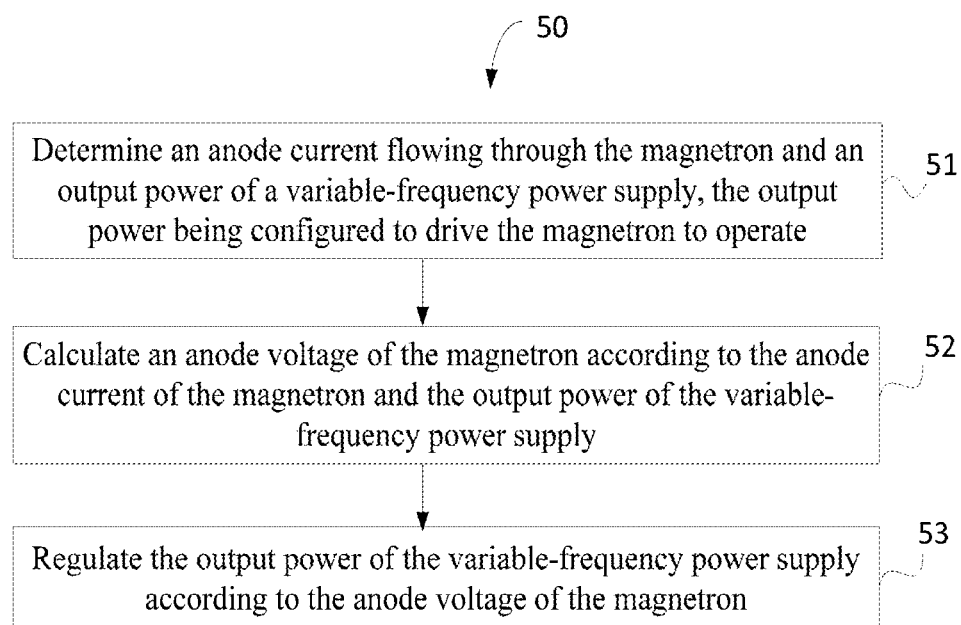
FIG. 15 is a schematic flowchart of a method for regulating a temperature of a magnetron according to an embodiment of the present application.

As illustrated in FIG. 15, the method 50 for regulating the temperature of the magnetron includes:

step 51: determining an anode current flowing through the magnetron and an output power of a variable-frequency power supply, the output power being configured to drive the magnetron to operate;

step 52: calculating an anode voltage of the magnetron according to the anode current of the magnetron and the output power of the variable-frequency power supply;

step 53: regulating the output power of the variable-frequency power supply according to the anode voltage of the magnetron.

In step 51, the anode current flowing through the magnetron may be determined by directly acquiring the anode current flowing through the magnetron, or by acquiring another reference current and converting the same to the anode current flowing through the magnetron, for example, acquiring a current of a high-voltage diode or an output current of a high-voltage transformer for equivalent conversion to obtain the anode current flowing through the magnetron.

With this method, the anode current flowing through the magnetron may be directly obtained such that anode temperature of the magnetron may be accurately reflected, so as to accurately and reliably adjust the anode temperature by regulating the output power of the variable-frequency power supply, and prevent over-temperature-induced damage of the magnetron.

Figure 16:
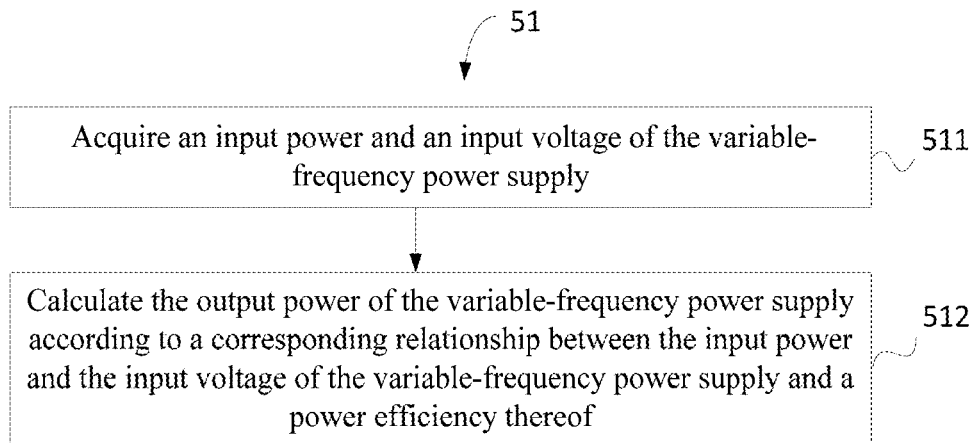
FIG. 16 is a schematic flowchart of step 51 in FIG. 15.

In some embodiments, as illustrated in FIG. 16, step 51 includes:

step 511: acquiring an input power and an input voltage of the variable-frequency power supply;

step 512: calculating the output power of the variable-frequency power supply according to a corresponding relationship between the input power and the input voltage of the variable-frequency power supply and a power efficiency thereof.

Figure 17:
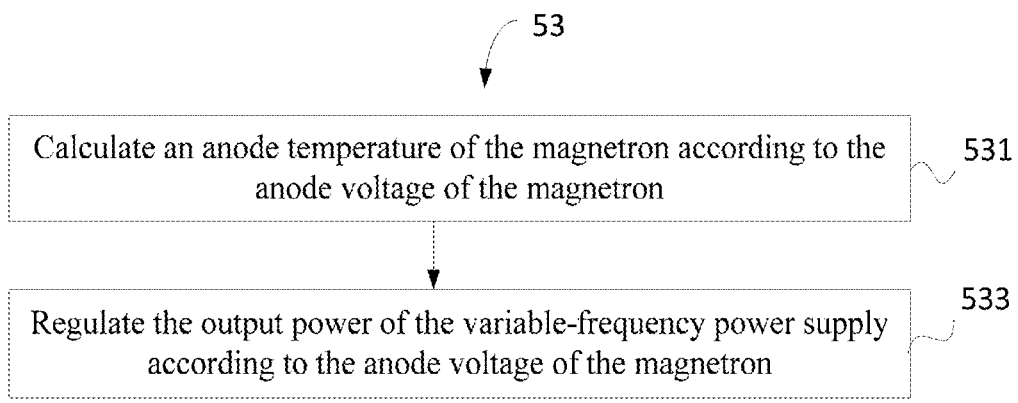
FIG. 17 is a schematic flowchart of step 53 in FIG. 15.

In some embodiments, as illustrated in FIG. 17, step 53 includes:

step 531: calculating an anode temperature of the magnetron according to the anode voltage of the magnetron;

step 533: regulating the output power of the variable-frequency power supply according to the anode voltage of the magnetron.

Figure 18:
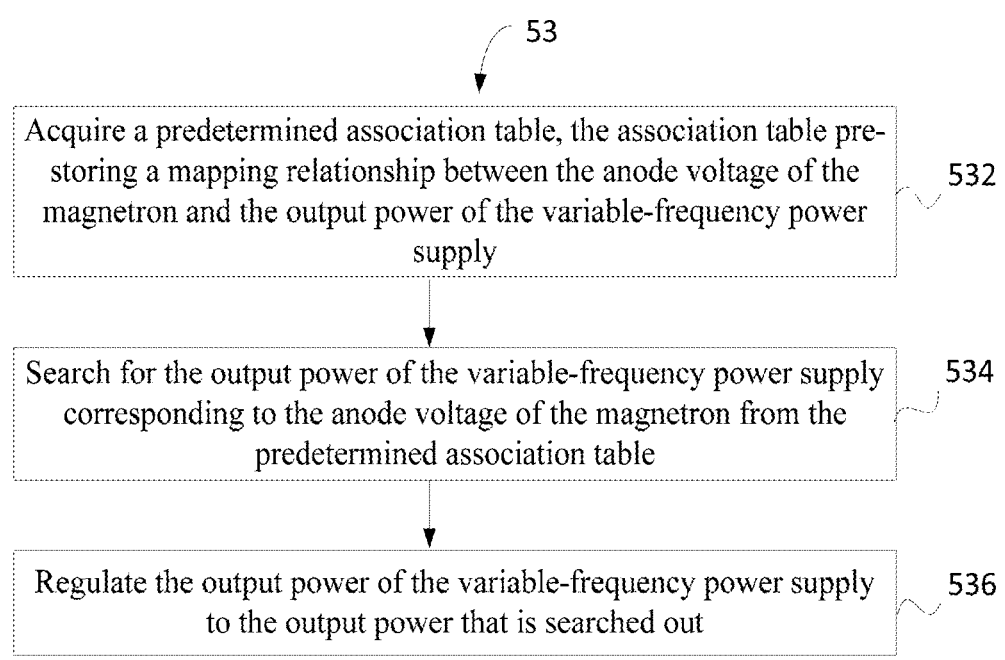
FIG. 18 is another schematic flowchart of step 53 in FIG. 15.

Different from the embodiment as illustrated in FIG. 17, as illustrated in FIG. 18, step 53 includes:

step 532: acquiring a predetermined association table, the association table pre-storing a mapping relationship between the anode voltage of the magnetron and the output power of the variable-frequency power supply;

step 534: searching for the output power of the variable-frequency power supply corresponding to the anode voltage of the magnetron from the predetermined association table;

step 536: regulating the output power of the variable-frequency power supply to the output power that is searched out.

Figure 19:
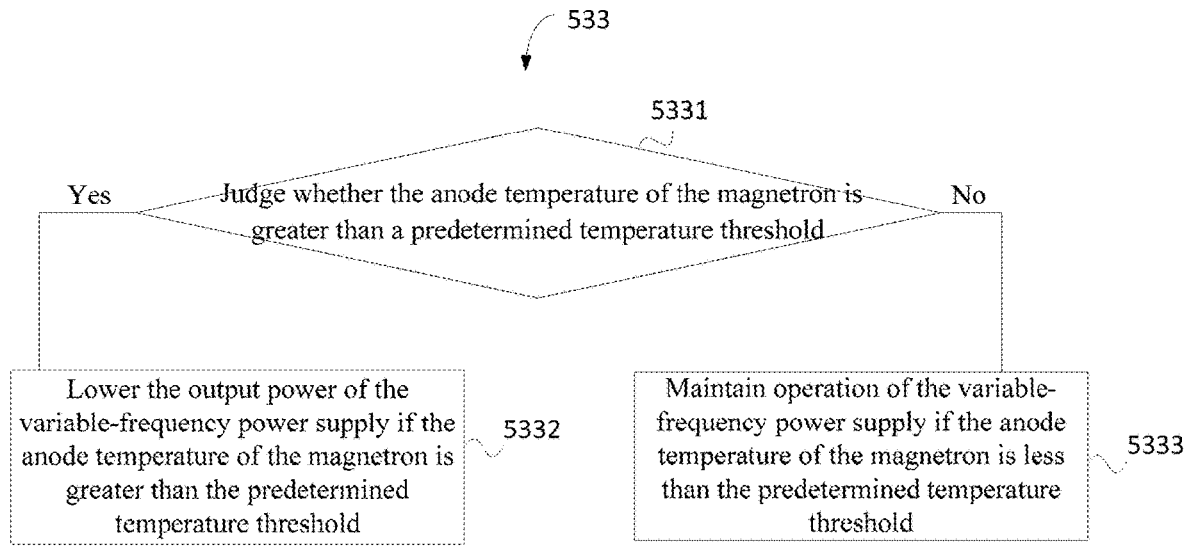
FIG. 19 is a schematic flowchart of step 533 in FIG. 17.

In some embodiments, as illustrated in FIG. 19, step 533 includes:

step 5331: judging whether the anode temperature of the magnetron is greater than a predetermined temperature threshold;

step 5332: lowering the output power of the variable-frequency power supply if the anode temperature of the magnetron is greater than the predetermined temperature threshold;

step 5333: maintaining operation of the variable-frequency power supply if the anode temperature of the magnetron is less than the predetermined temperature threshold.

Figure 20:
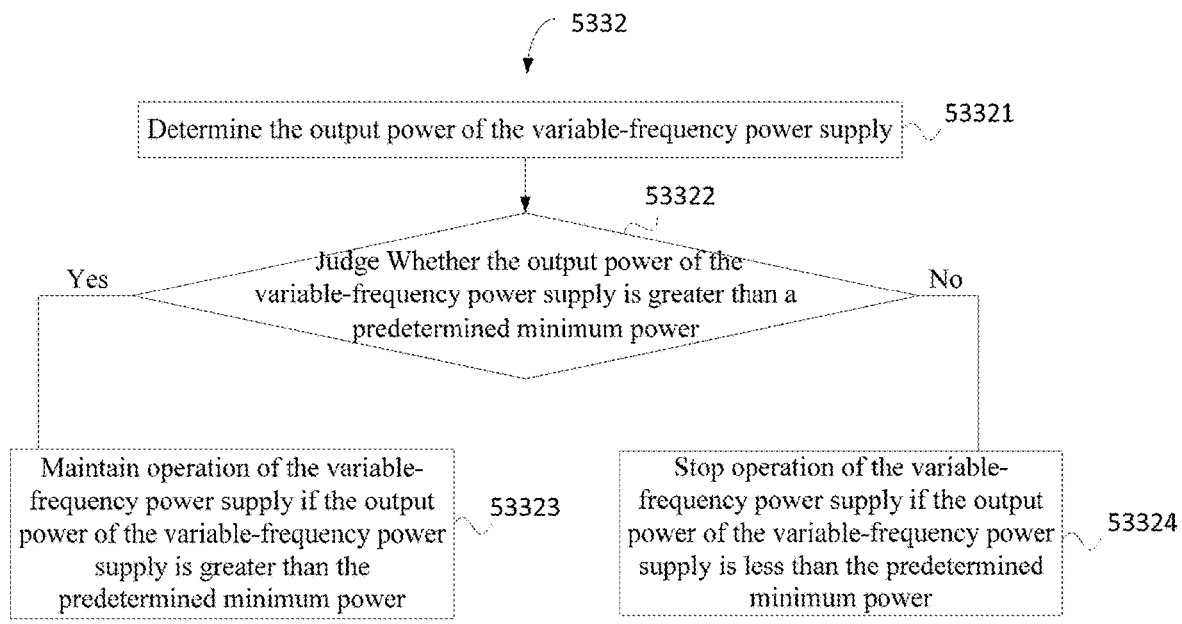
FIG. 20 is a schematic flowchart of step 5332 in FIG. 19.

In some embodiments, as illustrated in FIG. 20, step 5332 includes:

step 53321: determining the output power of the variable-frequency power supply;

step 53322: judging whether the output power of the variable-frequency power supply is greater than a predetermined minimum power;

step 53323: maintaining operation of the variable-frequency power supply if the output power of the variable-frequency power supply is greater than the predetermined minimum power;

step 53324: stopping operation of the variable-frequency power supply if the output power of the variable-frequency power supply is less than the predetermined minimum power.

Since the device embodiments are based on the same inventive concept as the method embodiments, in the case of no confliction of the content, the content of the method embodiments may be referenced to that of the device embodiment, which is not described herein any further.

As still another aspect of the embodiments of the present application, an embodiment of the present application provides a non-transitory computer-readable storage medium which stores computer-executable instructions. The computer-executable instructions, when being executed by a microwave apparatus, cause the microwave apparatus to perform the method for regulating the temperature of the magnetron as described above, for example, performing the method for regulating the temperature of the magnetron in any of the above method embodiments, or for example, performing the device for regulating the temperature of the magnetron in any of the above device embodiments.

With this method, the anode current flowing through the magnetron may be directly obtained such that anode temperature of the magnetron may be accurately reflected, so as to accurately and reliably adjust the anode temperature by regulating the output power of the variable-frequency power supply, and prevent over-temperature-induced damage of the magnetron.

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method for regulating a temperature of a magnetron, comprising:
   determining an anode current flowing through the magnetron and an output power of a variable-frequency power supply, the output power being configured to drive the magnetron to operate;
   calculating an anode voltage of the magnetron according to the anode current of the magnetron and the output power of the variable-frequency power supply;
   calculating an anode temperature of the magnetron according to the anode voltage of the magnetron;
   regulating the output power of the variable-frequency power supply according to the anode temperature of the magnetron to change the anode temperature of the magnetron.

2. The method according to claim 1, wherein determining the output power of the variable-frequency power supply comprises:
   acquiring an input power and an input voltage of the variable-frequency power supply;
   calculating the output power of the variable-frequency power supply according to the input power of the variable-frequency power supply, and a corresponding relationship between the input power and the input voltage of the variable-frequency power supply and a power efficiency thereof.

3. The method according to claim 1, wherein regulating the output power of the variable-frequency power supply according to the anode temperature of the magnetron comprises:
   determining whether the anode temperature of the magnetron is greater than a predetermined temperature threshold;
   lowering the output power of the variable-frequency power supply if the anode temperature of the magnetron is greater than the predetermined temperature threshold;
   maintaining operation of the variable-frequency power supply if the anode temperature of the magnetron is less than the predetermined temperature threshold.

4. The method according to claim 3, wherein lowering the output power of the variable-frequency power supply comprises:
   determining the output power of the variable-frequency power supply;
   determining whether the output power of the variable-frequency power supply is greater than a predetermined minimum power;
   maintaining operation of the variable-frequency power supply if the output power of the variable-frequency power supply is greater than the predetermined minimum power;
   stopping operation of the variable-frequency power supply if the output power of the variable-frequency power supply is less than the predetermined minimum power.

5. A controller, comprising:
   at least one processor; and
   a memory communicably connected to the at least one processor; wherein the memory stores instructions executable by the at least one processor, wherein the instructions, when being executed by the at least one processor, cause the at least one processor to perform:
   determining an anode current flowing through a magnetron and an output power of a variable-frequency power supply, the output power being configured to drive the magnetron to operate;
   calculating an anode voltage of the magnetron according to the anode current of the magnetron and the output power of the variable-frequency power supply;
   calculating an anode temperature of the magnetron according to the anode voltage of the magnetron;
   regulating the output power of the variable-frequency power supply according to the anode temperature of the magnetron to change the anode temperature of the magnetron.

6. The controller according to claim 5, wherein the instructions, when being executed by the at least one processor, further cause the at least one processor to perform:
   acquiring an input power and an input voltage of the variable-frequency power supply;
   calculating the output power of the variable-frequency power supply according to the input power of the variable-frequency power supply, and a corresponding relationship between the input power and the input voltage of the variable-frequency power supply and a power efficiency thereof.

7. The controller according to claim 5, wherein the instructions, when being executed by the at least one processor, further cause the at least one processor to perform:
determining whether the anode temperature of the magnetron is greater than a predetermined temperature threshold;
lowering the output power of the variable-frequency power supply if the anode temperature of the magnetron is greater than the predetermined temperature threshold;
maintaining operation of the variable-frequency power supply if the anode temperature of the magnetron is less than the predetermined temperature threshold.

8. The controller according to claim 7, wherein the instructions, when being executed by the at least one processor, further cause the at least one processor to perform:
determining the output power of the variable-frequency power supply;
determining whether the output power of the variable-frequency power supply is greater than a predetermined minimum power;
maintaining operation of the variable-frequency power supply if the output power of the variable-frequency power supply is greater than the predetermined minimum power;
stopping operation of the variable-frequency power supply if the output power of the variable-frequency power supply is less than the predetermined minimum power.

9. A microwave apparatus, comprising:
a magnetron;
a variable-frequency power supply, comprising a variable-frequency circuit, wherein the variable-frequency circuit is configured to drive the magnetron;
a current sampling circuit, connected to a first node between the variable-frequency circuit and the magnetron, and configured to sample an anode current flowing through the magnetron; and
a controller, connected to the current sampling circuit and the variable-frequency power supply or the variable-frequency circuit respectively, wherein the controller comprises at least one processor; and
a memory communicably connected to the at least one processor; wherein the memory stores instructions executable by the at least one processor, wherein the instructions, when being executed by the at least one processor, cause the at least one processor to perform:
determining an anode current flowing through the magnetron and an output power of a variable-frequency power supply, the output power being configured to drive the magnetron to operate;
calculating an anode voltage of the magnetron according to the anode current of the magnetron and the output power of the variable-frequency power supply;
calculating an anode temperature of the magnetron according to the anode voltage of the magnetron;
regulating the output power of the variable-frequency power supply according to the anode temperature of the magnetron.

10. The microwave apparatus according to claim 9, wherein the instructions, when being executed by the at least one processor, further cause the at least one processor to perform:
acquiring an input power and an input voltage of the variable-frequency power supply;
calculating the output power of the variable-frequency power supply according to the input power of the variable-frequency power supply, and a corresponding relationship between the input power and the input voltage of the variable-frequency power supply and a power efficiency thereof.

11. The microwave apparatus according to claim 9, wherein the instructions, when being executed by the at least one processor, further cause the at least one processor to perform:
determining whether the anode temperature of the magnetron is greater than a predetermined temperature threshold;
lowering the output power of the variable-frequency power supply if the anode temperature of the magnetron is greater than the predetermined temperature threshold;
maintaining operation of the variable-frequency power supply if the anode temperature of the magnetron is less than the predetermined temperature threshold.

12. The microwave apparatus according to claim 11, wherein the instructions, when being executed by the at least one processor, further cause the at least one processor to perform:
determining the output power of the variable-frequency power supply;
determining whether the output power of the variable-frequency power supply is greater than a predetermined minimum power;
maintaining operation of the variable-frequency power supply if the output power of the variable-frequency power supply is greater than the predetermined minimum power;
stopping operation of the variable-frequency power supply if the output power of the variable-frequency power supply is less than the predetermined minimum power.

13. The microwave apparatus according to claim 9, wherein the controller is arranged inside the variable-frequency power supply, the current sampling circuit comprises:
a current transformer, coupled between the variable-frequency circuit and the magnetron, and configured to sample the anode current flowing through the magnetron;
a first signal conditioning circuit, connected to the current transformer, and configured to condition the anode current sampled by the current transformer.

14. The microwave apparatus according to claim 9, wherein the controller is arranged outside the variable-frequency power supply, the current sampling circuit comprises:
a sampling resistor, connected in series between the variable-frequency power supply and the magnetron;
a second signal conditioning circuit, connected in parallel between two terminals of the sampling resistor, and configured to condition the anode current sampled by the sampling resistor.

15. The method according to claim 1, further comprising:
acquiring a predetermined association table, the predetermined association table pre-storing a mapping relationship between the anode voltage of the magnetron and the output power of the variable-frequency power supply;

searching for the output power of the variable-frequency power supply corresponding to the anode voltage of the magnetron from the predetermined association table;

regulating the output power of the variable-frequency power supply to the output power that is searched out.

16. The controller according to claim 5, wherein the instructions, when being executed by the at least one processor, further cause the at least one processor to perform:

acquiring a predetermined association table, the predetermined association table pre-storing a mapping relationship between the anode voltage of the magnetron and the output power of the variable-frequency power supply;

searching for the output power of the variable-frequency power supply corresponding to the anode voltage of the magnetron from the predetermined association table;

regulating the output power of the variable-frequency power supply to the output power that is searched out.

17. The microwave apparatus according to claim 9, wherein the instructions, when being executed by the at least one processor, further cause the at least one processor to perform:

acquiring a predetermined association table, the predetermined association table pre-storing a mapping relationship between the anode voltage of the magnetron and the output power of the variable-frequency power supply;

searching for the output power of the variable-frequency power supply corresponding to the anode voltage of the magnetron from the predetermined association table;

regulating the output power of the variable-frequency power supply to the output power that is searched out.

* * * * *